Sept. 12, 1933. J. McNEFF ET AL Re. 18,948

BLOW-OUT PREVENTING DEVICE AND OIL SAVER FOR DRILLING RIGS

Original Filed Oct. 23, 1928 2 Sheets-Sheet 1

Inventors
John McNeff
Samuel Hogan
By Clarence A. O'Brien
Attorney

Sept. 12, 1933. J. McNEFF ET AL Re. 18,948

BLOW-OUT PREVENTING DEVICE AND OIL SAVER FOR DRILLING RIGS

Original Filed Oct. 23, 1928 2 Sheets-Sheet 2

Inventors
John McNeff
Samuel Hogan
By Clarence A. O'Brien
Attorney

Reissued Sept. 12, 1933

Re. 18,948

UNITED STATES PATENT OFFICE 18,948

BLOW OUT PREVENTING DEVICE AND OIL SAVER FOR DRILLING RIGS

John McNeff, Monahans, and Samuel Hogan, Refugio, Tex.

Original No. 1,810,431, dated June 16, 1931, Serial No. 314,350, October 23, 1928. Application for reissue June 10, 1933. Serial No. 675,302

9 Claims. (Cl. 255—1)

This invention relates to a blowout preventer for use in oil well rotary drilling rigs.

An object of the invention is to provide a blowout preventer, or control head, for rotary well drilling rigs for association with the top of the well casing which is susceptible of being quickly installed in operative position thereon without requiring any changes in the well casing, and which will permit rotation as well as vertical movement of the drilling mechanism, and which is specially constructed to be readily removable from the casing to permit withdrawal and insertion of drilling tools.

A further object of our invention is the construction of a blowout preventer having stationary parts which may be readily connected to the top of a well casing, in which is arranged a rotary element for gripping the Kelly, or grief pipe, of the drill stem, of the drilling mechanism, which permits a rotary motion of the stem and also permits its vertical movement in the well.

Another object of the invention is to provide a means for carrying the Kelly during the drilling operation, which will rotate bodily with the Kelly.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which In the drawings:

Figure 1:
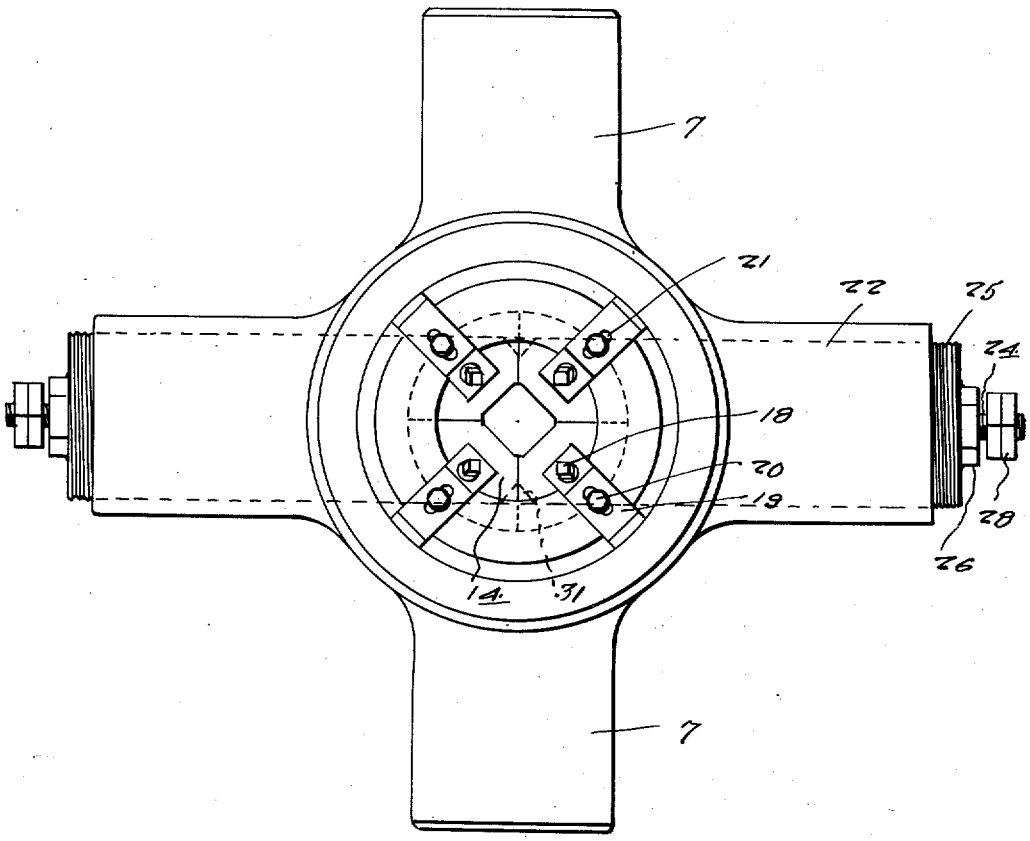
Figure 1 is a top plan view of the device.

Referring now to the drawings in detail, the numeral 5 designates a casing head which may be a casting of tubular formation with an opening extending vertically therethrough with its under side provided with an internally threaded tubular extension 6 adapted for threaded engagement with the upper section of the well casing.

Pipe connections 7 extend outwardly from opposite sides of the extension 6 and form discharge passages for the oil flowing upwardly through the casing. Suitable flow lines may be attached to said connections. The upper end of the casing head is of a substantially enlarged diameter with the inner surface of the walls 8 thereof formed with a shoulder 9 having an annular groove formed therein and providing a raceway for a set of ball bearings 10.

Figure 2:
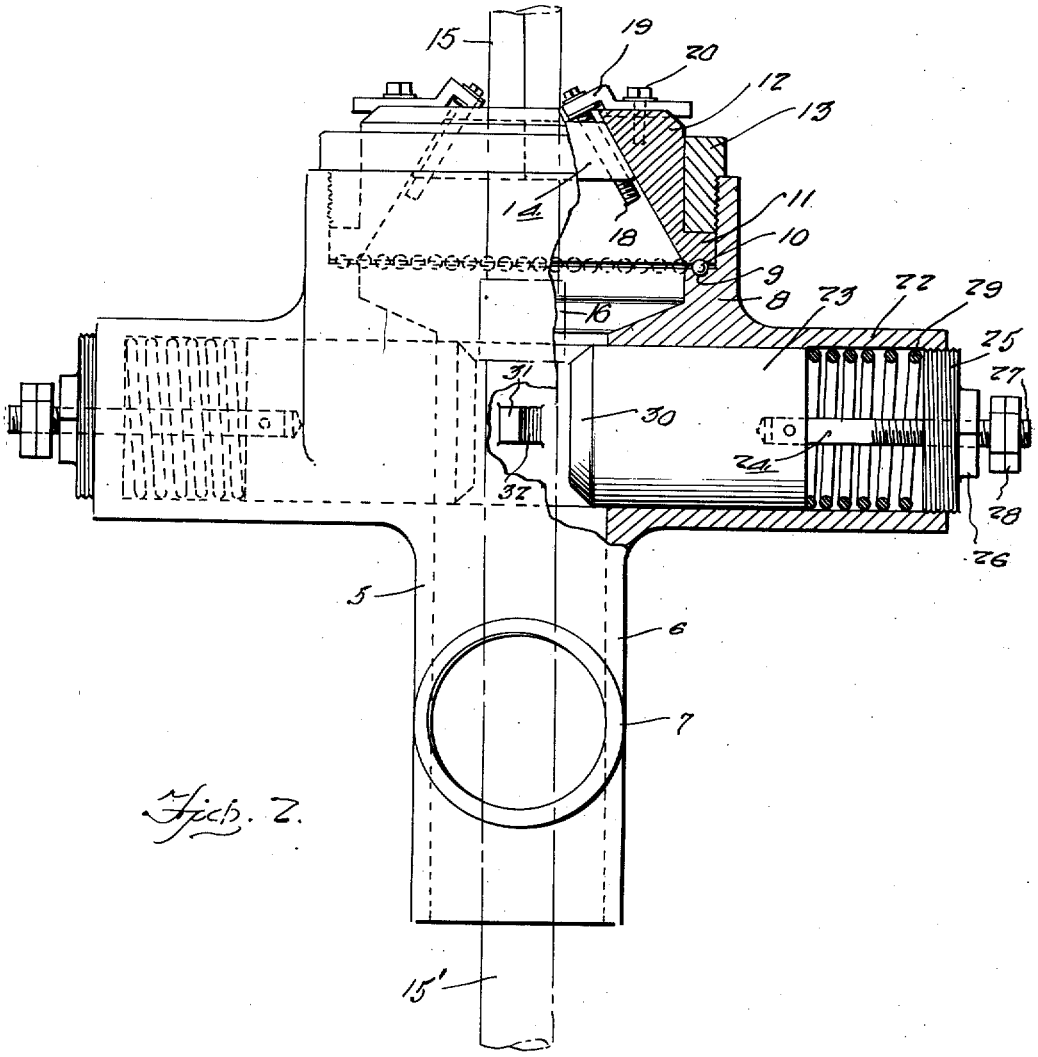
Figure 2 is a view in side elevation, with parts broken away and shown in section.
Figure 3:
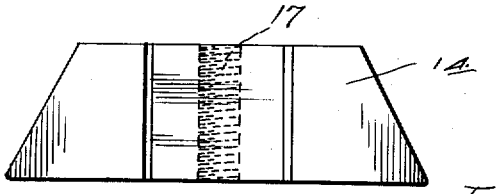
Figure 3 is an enlarged elevational view of one of the gripping segments for gripping the grief pipe or Kelly.

The lower flange 11 of a collar, or housing, 12 is supported upon the ball bearings for free rotary movement, the inner surface of said collar being tapered upwardly and inwardly, as clearly illustrated in Figure 2 of the drawings and with the outer surface of said collar immediately above its lower edge spaced from the walls 8 of the upper edge of the casting whereby to permit the fitting of a retaining ring 13 between the collar and the walls 8 and threadedly engaged with said walls whereby to retain the collar in position therein.

A segmental collet 14 is disposed inwardly of the collar 12 with the outer surface of the collet segments tapered in conformity with the tapered inner surface of the collar and with the inner surface of each of the collet segments disposed at right angles with its adjacent segment, whereby to combine in forming a square shaped opening, as clearly illustrated in Figure 1 of the drawings for clamping about the respective sides of a square shaped Kelly, or grief pipe 15. Associated with the Kelly is the usual drill pipe, or rod, designated by the numeral 15'.

The Kelly 15 is of a construction well known in the art for use in operating the drill stem and drilling tool of a rotary drilling rig and is connected in end to end relation with the drill stem sections by a coupling member 16.

Each of the collet segments 14 is provided with an upwardly and inwardly inclined threaded opening 17 having its axis disposed parallel with the tapered outer surfaces of the segment and through which a screw 18 is threadedly inserted.

The upper outer end of the screw 18 is retained in an attaching plate 19 secured to the upper edge of the collar 12 by a tap bolt 20.

We have clearly illustrated in Figure 2 of the drawings, the end of the attaching plate 19, through which the screw 18 is inserted, as bent angularly so that the same will be disposed at right angles with respect to said screw.

The tap bolt 20 is inserted in a slotted opening 21 formed in the plate to provide for the radial adjustment of the plate during the vertical adjustment of the screw 18. It will be apparent from an inspection of Figure 2 of the drawings that through the adjustment of the screw 18 the collet segment 14 may be adjusted vertically in clamping position about the respective sides of the Kelly.

Furthermore, by reason of the manner of rotatably supporting the collar 12 within the casting, the same is adapted for free rotation together with the Kelly during the operation of the drilling tool.

A pair of cylinders 22 are formed in the casing head, adjacent the upper end thereof and extend laterally from the head at diametrically opposite sides thereof. Pistons 23 are operatively mounted in each of the cylinders, each of said pistons being provided with a piston pin 24 extending outwardly through the outer end of the cylinder and slidably inserted through a plug 25 secured in threaded engagement at the outer end of the cylinder.

A nut 26 is cast integrally with the outer face of the plug 25 to provide gripping means for a wrench or other tool whereby to facilitate the securing of the plug in position in the cylinder. The outer end of the stem 24 is threaded as shown at 27 and protrudes outwardly of the plug with adjusting nuts 28 carried thereby and serving to limit the inward movement of the piston.

An expansion spring 29 is fitted in the cylinder at the outer end of the piston and retained therein by the plug 25 for urging the piston inwardly. The inner end of the cylinder 22 communicates with the central tubular portion of the casting, the inner end of the piston being normally retained out of abutting relation with the opposite sides of the Kelly, or grief pipe, during rotation thereof by sliding the stem 24 outwardly a predetermined distance and securing the same in such position by the nuts 28. While the drilling tool is being withdrawn or blowouts are threatened the stem is released by manually turning the nuts 28 and the springs 29 then urge the plungers 23 inwardly against the Kelly.

The inner ends of the pistons 23 are beveled as shown at 30 in order to permit the insertion of the drilling tool through the casing head so as to spread the pistons apart when placing the tools in the well and also to permit the vertical movement of the couplings 16, provided for connecting the sections of the drilling pipe with the Kelly without interference by said pistons.

As will be observed from an inspection of Figure 1 of the drawings, the diameter of the cylinders 22 is greater than the thickness of the Kelly, or the width of the opening within which the same is inserted and accordingly upon the removal of the Kelly and drilling tools from the well the pistons 23 will be forced inwardly with their ends in abutting relation thus serving to close the opening through the casing head.

In order to prevent the escape of oil or gas about the bevel inner ends of the piston, tapered projections 31 are formed at opposite sides within the tubular opening of the casting and provided with beveled vertical edges 32 to provide a snug fit with the beveled ends 30 of the piston upon the inward movement thereof and thus provide a seal for said beveled ends of the piston.

It will be apparent from the foregoing that in view of the manner in which the collet segments 14 are retained in clamping position about the Kelly bar that the blowing of the Kelly, drill stem, and the drilling tools carried on the end thereof from the well is prevented upon the encountering of an abnormal oil or gas pressure during the drilling operation. Furthermore the tool may be removed from the well, when desired, substantially without permitting the escape of the oil or gas from the well and in addition the tool may be reinserted in the well while at the same time, keeping the well substantially sealed against the escape of the oil or gas therefrom.

It is obvious that our invention is susceptible to various changes and modifications in construction without departing from the spirit of the invention or the scope of the appended claims, and we accordingly claim all such forms of the device to which we are entitled.

What we claim is:

1. A device of the class described comprising a casting forming a coupling for the open end of the well casing and having an opening extending vertically therethrough for receiving the well drilling rod, and clamping means for the rod mounted in the upper end of the casting and comprising a rotatable collar having its inner wall inclined from a vertical plane, said collar being rotatable in the casting, a plurality of collet segments disposed in wedging position between the collar and the drilling rod, and adjusting means for the segments extending parallel with the inclined wall of the collar.

2. A device of the class described comprising a casting forming a coupling for the open end of the well casing and having an opening extending vertically therethrough for receiving the well drilling rod, and clamping means for the rod mounted in the upper end of the casting and comprising a collar rotatable in the casting having its inner wall inclined from a vertical plane, a plurality of collet segments disposed in wedging position between the collar and the drilling rod, adjusting screws in said collet segments and extending parallel with the inclined wall of the collar, and attaching plates carried by the collar and adjustable radially thereof, said adjusting screws being adjustably mounted on the attaching plates.

3. A device of the class described comprising a casing forming a coupling for the open end of the well casing and having an opening extending vertically therethrough for receiving the well drilling rod, and clamping means for the rod mounted in the upper end of the first mentioned casing and comprising a collar having its inner wall inclined from a vertical plane, a plurality of collet segments disposed in wedging position between the collar and the drilling rod, adjusting screws in said collet segments and extending parallel with the inclined wall of the collar, and attaching plates carried by the collar and adjustable radially thereof, said plates having adjustably mounted thereon the adjusting screws, said plates having their inner ends angularly disposed for supporting the screws at right angles thereto.

4. A device of the class described comprising a casting adapted for attachment to a well casing and having a central opening extending vertically therethrough for receiving a rotary drilling rod, a shoulder formed on the inner wall of the casting adjacent the upper end thereof, said shoulder having an annular groove arranged therein whereby to provide a ball bearing raceway, a collar rotatably supported on said shoulder with its inner surface tapered upwardly and inwardly, said collar being rotatable within the casting, attaching plates mounted for radial adjustment upon the upper edge of said collar, a segmental collet disposed inwardly of the collar in clamping position with the rod and with the outer edges of said segments bevelled in conformity with the inner surface of the collar, means carried by the attaching plates for adjustably securing said segments thereto, and a retaining ring for securing said collar in position in said casting.

5. In a control head, a casing head adapted to be attached to the top of a well casing and having a passageway for an inner pipe therethrough, a tubular housing rotatably mounted on said casing head and having upwardly converging walls, a collet formed of segments having a slidable engagement with said walls and movable into upper and inner position into close fitting relation about said inner pipe and into lower and outer position spaced from said inner pipe.

6. In a device of the character described, a casing head adapted to be attached to the top of a well casing and having a passageway for an inner pipe therethrough, a collar forming a tubular housing rotatably mounted on said casing head and shaped to receive said inner pipe, means in the housing movable into active position to close the space between the inner pipe and housing and into inactive position spaced away from said pipe and shafts having threaded connections with said closing means for adjusting the latter into active or inactive positions.

7. A device of the character described comprising a casing head forming a coupling for the open end of the well casing and having an opening extending vertically therethrough for receiving a drill stem, clamping means for the stem mounted in the upper end of the casing head and including a rotatable collar-like housing having its inner wall converging upwardly, said housing being rotatable in the casing head, sectional closing means disposed in wedging position between said wall and the drill stem and adjusting means parallel with said inclined wall in operative connection with said closing means for adjusting the same into active and inactive positions.

8. A device of the character described comprising a casing head adapted to be attached to the upper end of a casing in a well and having a passageway extending vertically therethrough for receiving a drill stem, clamping means for said stem mounted on the upper end of the casing head and including a housing rotatably mounted on the casing head and having an upwardly converging inner wall, a segmental closing device disposed in wedging position betwen the housing and stem, adjusting means operatively connected with said segments and approximately parallel with said wall, said adjusting means having a swiveling connection with the housing.

9. A device of the character described comprising a casing head adapted to be attached to the top of a well casing and having a passageway extending vertically therethrough for a drill stem, clamping means for the stem mounted in the casing head and comprising a collar-like housing having an inside upwardly converging wall, a plurality of collet segments disposed in wedging position between said wall and stem, adjusting screws connected to the housing and operatively connected with said segments whereby the segments may be adjusted into active position to close the space between wall and stem and into inactive position to open said space.

JOHN McNEFF.
SAMUEL HOGAN.